US008626125B2

(12) United States Patent
Lee et al.

(10) Patent No.: US 8,626,125 B2
(45) Date of Patent: Jan. 7, 2014

(54) APPARATUS AND METHOD FOR SECURING MOBILE TERMINAL

(75) Inventors: Joon-Seub Lee, Incheon-si (KR);
Jin-Young Kim, Gwacheon-si (KR);
Min-Che Jeong, Gunpo-si (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/351,119

(22) Filed: Jan. 16, 2012

(65) Prior Publication Data

US 2013/0052992 A1 Feb. 28, 2013

(30) Foreign Application Priority Data

Aug. 24, 2011 (KR) ........................ 10-2011-0084790

(51) Int. Cl.
*H04M 1/66* (2006.01)
(52) U.S. Cl.
USPC .......... 455/411; 455/410; 455/432.2; 726/25; 726/22; 726/1; 726/17
(58) Field of Classification Search
USPC ......... 455/410–411, 432.2; 726/1, 17, 25, 22; 717/126
See application file for complete search history.

(56) References Cited

U.S. PATENT DOCUMENTS

| 6,101,607 | A * | 8/2000 | Bachand et al. ................ 726/17 |
| 7,698,442 | B1 | 4/2010 | Krishnamurthy et al. |
| 8,045,958 | B2 * | 10/2011 | Kahandaliyanage ......... 455/410 |
| 8,255,991 | B1 | 8/2012 | Hackborn et al. |
| 2004/0127190 | A1 | 7/2004 | Hansson et al. |
| 2004/0155907 | A1 | 8/2004 | Yamaguchi et al. |
| 2005/0070276 | A1 * | 3/2005 | McGarry ................... 455/432.2 |
| 2006/0101408 | A1 * | 5/2006 | Kotamarthi et al. .......... 717/126 |

(Continued)

FOREIGN PATENT DOCUMENTS

| EP | 1564957 | 8/2005 |
| JP | 2008-160537 | 7/2008 |

(Continued)

OTHER PUBLICATIONS

Do Hyun Kim, et al., "EIS-Smart Phone: A Study for Enhanced Information Security in Android Smart Phone," Articles of Korea information technology convergence conference, book 3, vol. 2, published on Sep. 2010 by Department of Computer Science and Engineering, Seoul Tech, Korea.

(Continued)

*Primary Examiner* — David Q Nguyen
(74) *Attorney, Agent, or Firm* — H.C. Park & Associates, PLC

(57) ABSTRACT

A mobile terminal and a method for securing information are provided. The mobile terminal includes an application part to receive information related to an application; a determining unit to receive a command issued by the application and to determine whether the command or the application is authorized to access a system resource of the mobile terminal; and a blocking unit to block an execution of the command in response to a determination that the execution of the command is unauthorized or issued by the unauthorized application. The method includes receiving information related to an application; receiving a request for executing a command issued by the application; determining whether the requested command or the application is authorized to access a system resource of a mobile terminal; and blocking execution of the command in response to a determination that the execution of the command is unauthorized or issued by an unauthorized application.

22 Claims, 25 Drawing Sheets

(56) References Cited

U.S. PATENT DOCUMENTS

| | | |
|---|---|---|
| 2006/0203736 A1 | 9/2006 | Molen et al. |
| 2007/0118558 A1* | 5/2007 | Kahandaliyanage ...... 707/104.1 |
| 2007/0204324 A1* | 8/2007 | Roberts et al. .................... 726/1 |
| 2007/0272752 A1 | 11/2007 | Nakatsugawa et al. |
| 2010/0306718 A1 | 12/2010 | Shim et al. |
| 2011/0081889 A1 | 4/2011 | Gao et al. |
| 2011/0088086 A1 | 4/2011 | Swink et al. |
| 2012/0137369 A1* | 5/2012 | Shin et al. ....................... 726/25 |
| 2012/0222120 A1 | 8/2012 | Rim et al. |
| 2012/0240224 A1 | 9/2012 | Payne et al. |
| 2012/0311697 A1 | 12/2012 | Swingler et al. |
| 2012/0317638 A1 | 12/2012 | Carrara et al. |

FOREIGN PATENT DOCUMENTS

| | | |
|---|---|---|
| JP | 2010-097594 | 4/2010 |
| KR | 10-2003-0054620 | 7/2003 |
| KR | 10-2005-0018145 | 2/2005 |
| KR | 10-2006-0015134 | 2/2006 |
| KR | 10-2006-0033067 | 4/2006 |
| KR | 10-2006-0094564 | 8/2006 |
| KR | 10-0681684 | 2/2007 |
| KR | 10-0690759 | 2/2007 |
| KR | 10-2007-0075223 | 7/2007 |
| KR | 10-2008-0013483 | 2/2008 |
| KR | 10-0937166 | 1/2010 |
| KR | 10-2010-0092613 | 8/2010 |
| KR | 10-1012872 | 1/2011 |
| KR | 10-2011-0055095 | 5/2011 |
| WO | 02-103498 | 12/2002 |

OTHER PUBLICATIONS

Non-Final Office Action of U.S. Appl. No. 13/351,136, dated Feb. 1, 2013.

Final Office Action issued on Jul. 31, 2013 in U.S. Appl. No. 13/351,136.

Non-Final Office Action issued on Sep. 25, 2013 in U.S. Appl. No. 13/351,126.

* cited by examiner

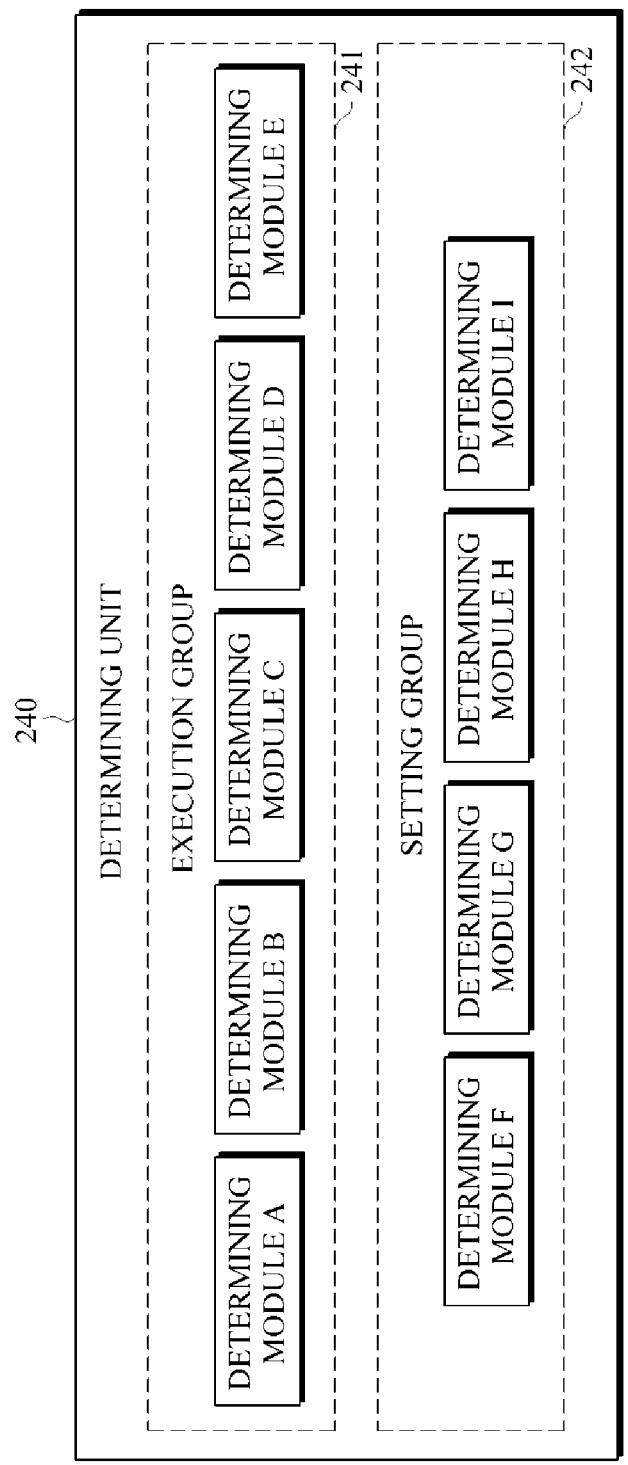

FIG. 8B

| INDICATOR |  |
|---|---|
| SETTINGS APP |  |
| VOICE CALL | V |
| MULTIMEDIA | V |
| SMS | ☐ |
| GPS | V |
| 3G DATA | ☐ |
| EMAIL | V |
| WIFI | V |

FIG. 9B

| INDICATOR |  |
|---|---|
| SETTINGS APP | |
| SECURITY LEVEL SETTING | |
| HIGH | ○ |
| MIDDLE | ⦿ |
| LOW | ○ |
| DEFAULT | ○ |

FIG. 11B

| INDICATOR | |
|---|---|
| SETTINGS APP | |
| SECURITY SETTING | |
| TRUSTED APP | ○ |
| INSTALLED APP | ⬤ |
| ACTIVATED APP | ○ |
| REQUESTED APP | ○ |

FIG. 19

| INDICATOR |  |
|---|---|
| SETTINGS APP | |
| BLOCKING NOTIFICATION SETTING | |
| NOTIFY TO HOME SCREEN | ○ |
| NOTIFIY TO INDICATOR AREA | ⬤ |
| DIRECTLY NOTIFY UPON BLOCKING | ○ |
| STORE IN LIST | ○ |

APPARATUS AND METHOD FOR SECURING MOBILE TERMINAL

CROSS-REFERENCE TO RELATED APPLICATION

This application claims the benefit under 35 U.S.C. §119(a) of a Korean Patent Application No. 10-2011-0084790, filed on Aug. 24, 2011, the entire disclosure of which is incorporated herein by reference for all purposes. This application is related to U.S. patent application Ser. No. 13/351,126, filed on Jan. 16, 2012, which claims priority from and the benefit of Korean Patent Application No. 10-2011-0084789, filed on Aug. 24, 2011, and U.S. patent application Ser. No. 13/351,136, filed on Jan. 16, 2012, which claims priority from and the benefit of Korean Patent Application No. 10-2011-0084791, filed on Aug. 24, 2011, all of which are assigned to the same assignee as the current application, and all of which are incorporated by reference in its entirety as if fully set forth herein.

BACKGROUND

1. Field

The following description relates to a mobile terminal, and more particularly, to a mobile terminal and a method for securing applications and services that are executed in a mobile terminal.

2. Discussion of the Background

A software platform may refer to a system environment in which application programs can be executed. Open platforms have been introduced to provide users with various beneficial services. The open platforms have provided a popular technology platform for various mobile communication terminals.

For example, software developers may develop applications that may be provided or uploaded to a software vendor site, such as an application store, according to an open platform specification. Accordingly, various users may access the web site to download and install applications of choice at a low cost or for free, to receive the corresponding services.

However, while such an open service environment may provide users with various services, the open service environment may provide a possibility of leakage of personal information, virus infection, and fatal system errors by malicious applications or applications with malware (e.g., spyware, virus, add-on applications, and the like).

That is, since an application, whether valid or malicious, can call an open platform Application Programming Interface (API), leakage of user's personal information and abnormal charges may be incurred. For example, if a user installs an application, which the user knows to provide only an alarm operation, the application may call, when it is used or after it is installed, a platform API that can access the user's phonebook, acquire the user's phonebook through the platform API, and then call a platform API that allows use of a network so that the user's phonebook may be hacked.

SUMMARY

Exemplary embodiments of the present invention provide an apparatus and method for securing information stored in a mobile terminal.

Additional features of the invention will be set forth in the description which follows, and in part will be apparent from the description, or may be learned by practice of the invention.

Exemplary embodiments of the present invention provide a mobile terminal including an application part to receive information related to an application, the application being an authorized application or an unauthorized application, a determining unit to receive a request to execute a command issued by the application and to determine whether the command or the application is authorized to access a system resource of the mobile terminal, a blocking unit to block an execution of the command in response to a determination that the execution of the command is unauthorized or issued by the unauthorized application, and a service unit to execute the command in response to a determination that the execution command is authorized and issued by the authorized application.

Exemplary embodiments of the present invention provide a method for securing information in a mobile terminal including receiving information related to an application, receiving a request for executing a command issued by the application, determining whether the requested command or the application is authorized to access a system resource of a mobile terminal, blocking execution of the command in response to a determination that the execution of is the command is unauthorized or issued by an unauthorized application, and executing the command in response to a determination that the execution of the command is authorized or issued by an authorized application.

Exemplary embodiments of the present invention provide a method for securing information in a mobile terminal including storing a reference value corresponding to a command and a list of authorized applications, receiving a request for executing a command issued by an application, extracting the command and information related to the application from the request, comparing the extracted command and information to a stored reference value for determining whether the requested command or the application is authorized, blocking the execution of the command in response to a determination that the execution of the command or the application is unauthorized, and executing the command in response to a determination that the execution of the command and the application are authorized.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2A is a block diagram illustrating a determining unit according to an exemplary embodiment of the invention.

FIG. 8A and FIG. 8B are figures illustrating an operation of a determining module F according to an exemplary embodiment of the invention.

FIG. 9A and FIG. 9B are figures illustrating an operation of a determining module G according to an exemplary embodiment of the invention.

FIG. 11A and FIG. 11B are figures illustrating an operation of a determining module I according to an exemplary embodiment of the invention.

FIG. 19 is a screen shot illustrating an operation of a blocking module H according to an exemplary embodiment of the invention.

DETAILED DESCRIPTION OF THE ILLUSTRATED EMBODIMENTS

Figure 1:
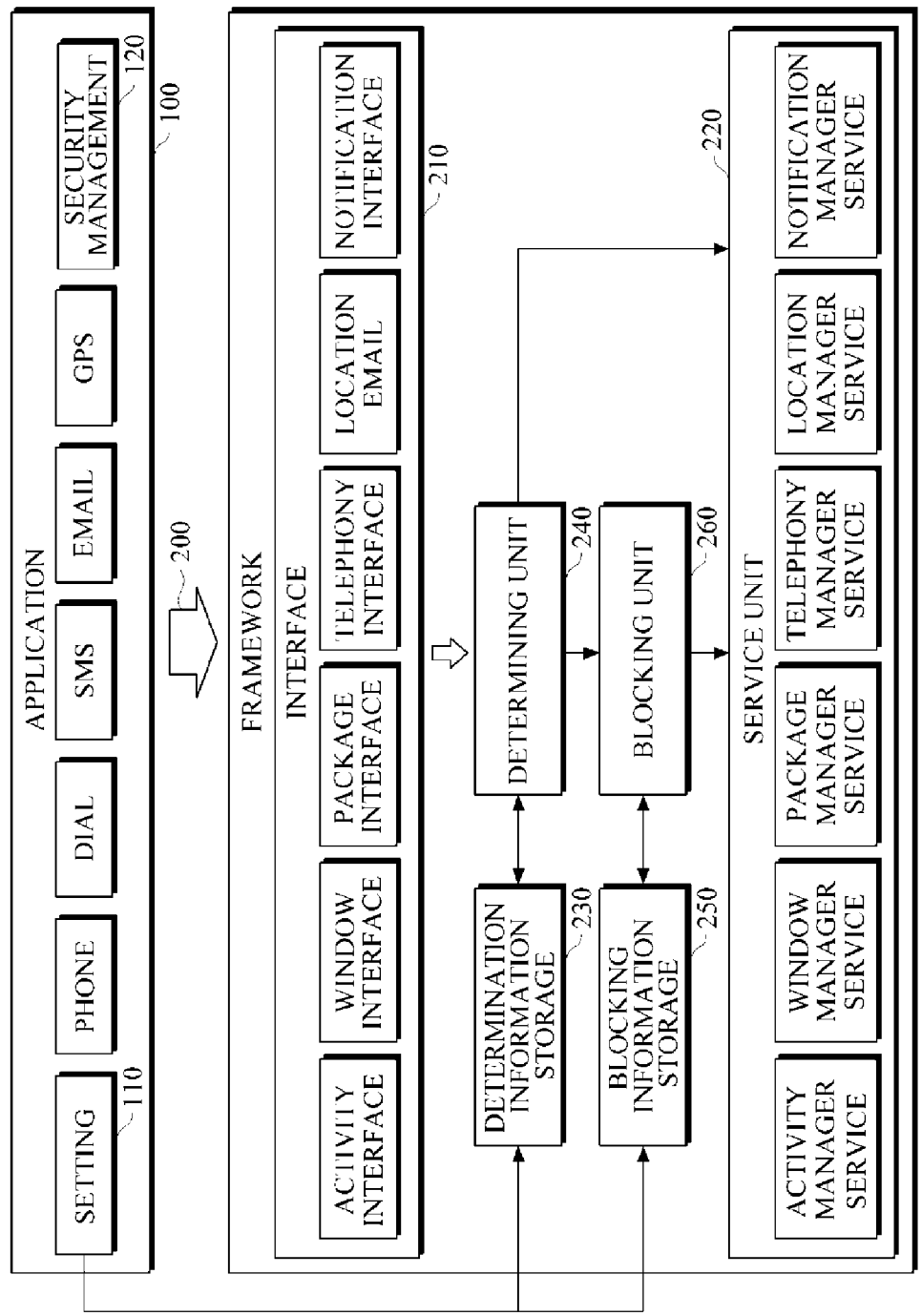
FIG. 1 is a block diagram illustrating a mobile terminal according to an exemplary is embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be is understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

FIG. 1 is a block diagram illustrating a mobile terminal according to an exemplary embodiment of the invention.

Referring to FIG. 1, the mobile terminal system includes an application part 100 and a framework part 200. The application part 100 may include applications that may initially be installed by a manufacturing company, and/or applications that may have been downloaded by a user through a wired/wireless communication network. The applications may execute various operations through the framework part 200.

As shown in FIG. 1, applications may include, without limitation, a setting application 110, a phone application, a dial application, a short message service (SMS) application, an email application, a global positioning system (GPS) application, a security management application 120.

The framework part 200 includes an interface unit 210 and a service unit 220. The interface unit 210 may receive a command execution request or a request to execute a command that may be generated if an application is executed, and transfer the command execution request to a processing unit 260. The framework part 200 includes various interface components corresponding to various kinds of command execution requests. The service unit 220 may perform a service corresponding to the command execution request, which may be is transferred from the interface unit 210. The service unit 220 may include a plurality of manager services corresponding to the components included in the interface unit 210. Details related to the interface unit 210 and the service unit 220 are well known, accordingly, descriptions thereof will be omitted.

Further, as shown in FIG. 1, the interface unit 210 may include, without limitation, an activity interface, a window interface, a package interface, a telephony interface, a location email interface, and a notification interface. The service unit 220 may include, without limitation, an activity manager service unit, a window manager service unit, a package manager service unit, a telephony manager service unit, a location manager service unit, and a notification manager service unit.

However, if an application containing malware (e.g., spyware, virus, add-ons, and the like) accesses the mobile terminal system, the mobile terminal system may be exposed to malicious attacks. Interfaces may transfer one or more command execution requests to a service unit, without considering potential security risks against unintended attacks by such applications. Accordingly, the framework part 200 may perform operations that may not have been intended by a user or within the scope of operation of the respective application, which may lead to unnecessary consumption of battery, data overcharge, and leakage of confidential data.

Therefore, the framework part 200 of the mobile terminal system may further include a component to block execution of applications and services that may not have been intended by a user or within the scope of operation of the respective application.

Referring again to FIG. 1, the framework part 200 further includes a determination information storage unit 230, a determining unit 240, a blocking information storage unit 250, and a blocking unit 260.

The determination information storage 230 may store reference information to determine whether to block a command execution request generated by an application of the application part 100. The reference information may be stored in advance by a manufacturing company, a third party vendor, or set by a user. Further, the reference information may be received by a server and/or during the operation of the mobile terminal.

The setting application 110 may provide a user interface to allow a user to set reference information that may be used to determine whether to block one or more unauthorized commands issued by applications and services, such as Calling service, SMS service, GPS service, Alarm service, Email service, and the like. Details related to the setting application 110 may be described later with the discussion of operations of the determining unit 240 and the blocking unit 260. The determining unit 240 may determine whether to block the execution request signal that may be generated by the application part 100 through the interface unit 210, if such request signal is received. A method in which the determining unit 240 determines whether to block the execution request signal may be implemented as various embodiments.

As illustrated in FIG. 2A, the determining unit 240 may include a one or more determining modules. The determining modules may operate independently, or in conjunction with one another. Details related to the operation of the determining modules included in the determining unit 240 will be described later.

The blocking information storage 250 may store format information related to blocking notification, which may be used to notify a user of the command execution request received from the determining unit 230. The format information may be stored in advance by a manufacturing company or set by a user through the setting application 110. Further, the format information may be received from a server during its operation.

Figure 2B:
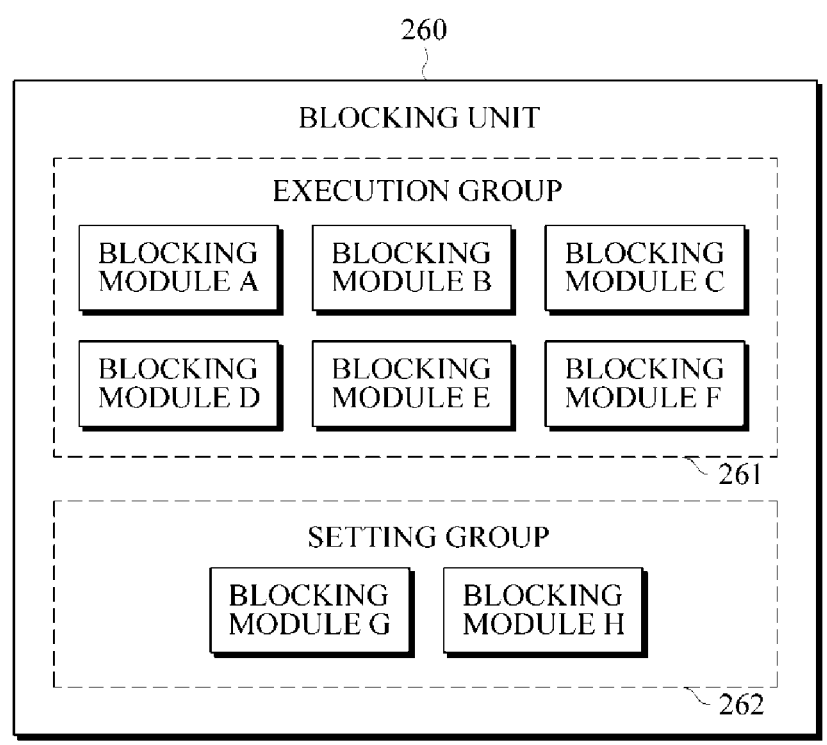
FIG. 2B is a diagram illustrating a blocking unit according to an exemplary embodiment of the invention.

The blocking unit 260 may operate to block execution request signals that are directed to applications and services that are determined to be blocked by the determining unit 240. A method in which the blocking unit 260 blocks execution request signals that are directed to applications and services may be implemented as various embodiments. The blocking unit 260 may include one or more blocking modules as illustrated in FIG. 2B. The blocking modules may operate independently, or in conjunction with one another. Details related to the operation of the blocking unit 260 will be described later.

As described above, application part 100 of the mobile terminal system further includes the setting application 110 and a security management application 120.

The setting application 110 may provide a user interface to receive a user selection of reference information that may be used to determine whether to block a command execution request and/or to select format information that may be used to provide a blocking notification operation. Also, the setting application 110 may store the reference information and the format information in the determination information storage 230 and in the blocking information storage 250, respectively. The reference information and the format information may be received from an input provided by a user through the user interface (e.g., a touch input, key input, voice input, and the like). Further, the respective information may also be received by a third party through a server.

The security management application 120 may receive information related to the applications and services that are determined to be blocked, from the blocking information storage 250, and informs the user of access times, access commands, information about one or more applications that attempts abnormal accesses, and the like. That is, the security management application 120 may provide an operation to delete and report applications that are is determined to be blocked, and executes the operation according to a request from the user or one or more reference conditions.

Hereinafter, the configuration and operation of the determining unit 240 will be described in detail.

FIG. 2A is a block diagram illustrating a determining unit according to an exemplary embodiment of the invention.

Referring to FIG. 2A, the determining unit 240 includes a determining module A, a determining module B, a determining module C, a determining module D, a determining module E, a determining module F, a determining module G, a determining module H, and a determining module I. These determining modules may be classified into one of two groups: an execution group 241 and a setting group 242. The execution group may make a determination on which applications or services to block. The determination may be based on information that may be received from a manufacturing company, a user, a third party vendor and the like. The setting group 242 may control driving of one or more determining modules included in the execution group 241 based on setting information of the setting application 110 (see FIG. 1).

The determining modules included in the execution group 241 will be described below.

Figure 3:
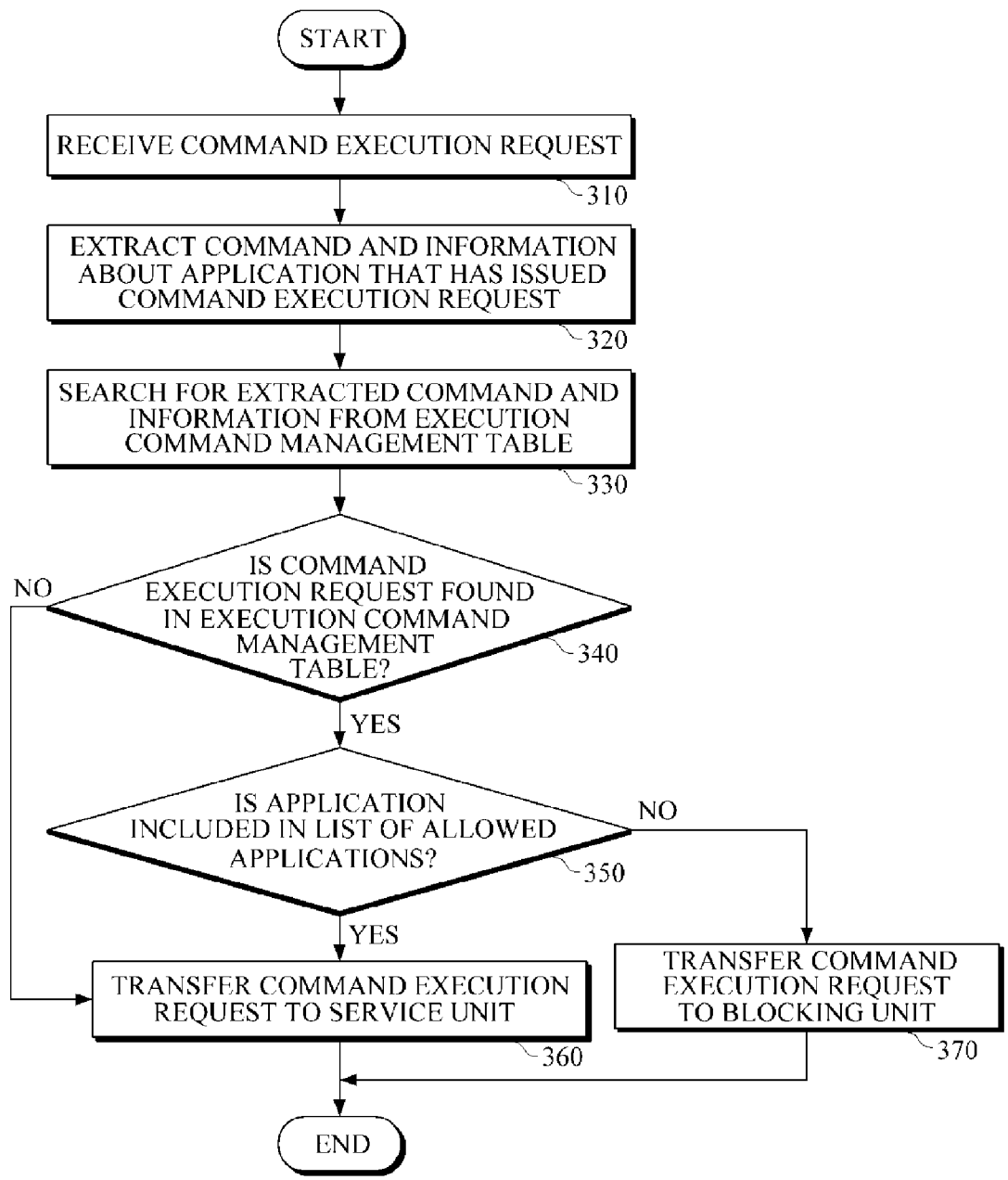
FIG. 3 is a flowchart illustrating an operation of a determining module A according to an exemplary embodiment of the invention.

FIG. 3 is a flowchart illustrating an operation of a determining module A according to an exemplary embodiment of the invention.

Referring to FIG. 1, FIG. 2A and FIG. 3, if a determining module A receives a command execution request, which may include an execution command and a request to access a system resource of a mobile terminal, such as an Application Programming Interface (API) or data storage, is received from a requesting application (310), the determining module A extracts is the execution command and information about the application that has issued or transmitted the command execution request (320).

For example, if the determining module A receives an execution command ACTION_CALL, the determining module A may acquire information related to a package name or other relevant information of an application that has requested execution of the execution command ACTION_CALL. The package name information may be acquired from an activity manager service of the service unit 220.

As another example, if the determining module A receives a command execution request to process an API SmsManager.sendTextMessage, which may provide a message sending operation, the determining module A may extract the API SmsManager.sendTextMessage and acquires information related to a package name of an application that has issued or transmitted the command execution request, from a package manager service of the service unit 220.

As another example, if the determining module A receives a command execution request to process an API ContentResolver.query, which may be a database or data storage access operation, the determining module A extracts the API ContentResolver.query, and acquires information related to a package name of an application that has issued or transmitted the command execution request, from the package manager service of the service unit 220.

The determining module A may search for the execution command and the information about the application that has issued or transmitted the command execution request from an execution command management table stored in the determination information storage 230 (see FIG. 1).

An example of the execution command management table is shown as Table 1, below.

TABLE 1

| | Command and/or API | List of Allowed Applications |
|---|---|---|
| Call | ACTION_CALL | Com.android.contacts |
| Message | SmsManager.sendTextMessage( ) | Com.android.contacts, Com.patech.application.mms KakaoTalk |
| GPS | LocationManager.requestLocationUpdates( ) | Com.google.android.maps, Com.android.camera |

TABLE 1-continued

|  | Command and/or API | List of Allowed Applications |
|---|---|---|
| Network | StarUsingNetworkFeature( ) | Com.android.browser<br>Com.androidware(Game)<br>Com.android.vending(Market) |
| DB | ContentResolver.query( ) | Com.android.contacts |

Accordingly, the determining module A searches for the execution command and the package name of the application from the execution command management table (330). The determining module A determines whether the execution command is found in the execution command management table (340).

If the execution command is not found in the execution command management table, the determining module A determines that the command execution request is allowed or authorized, and transfers the command execution request to the service unit 220 (360).

If the execution command is found in the execution command management table, the determining module A determines whether the application that has issued the command execution request is included in the list of allowed or authorized applications on the execution command management table (350).

If the application is included in the list of allowed or authorized applications, the determining module A determines that the application is allowed or authorized, and transfers the command execution request to the service unit 220 (360). In an example, ContentResolver.query( ) command may be determined to be issued by an application with a package name of Com.android.contacts, which may be determined to be an allowed or authorized application to execute such a command. Accordingly, the determining module A may transfer the respective command execution request of ContentResolver.query( ) command to the service unit 220.

If the application is not included in the list of allowed or authorized applications, the determining module A transfers the command execution request to the blocking unit 260 so that the blocking unit 260 blocks the command execution request (370).

That is, if the determining module A receives a command execution request that has been generated by a disallowed or unauthorized application, the determining module A may determine to block the command execution request and request the blocking unit 260 to block the command execution request.

Figure 4:
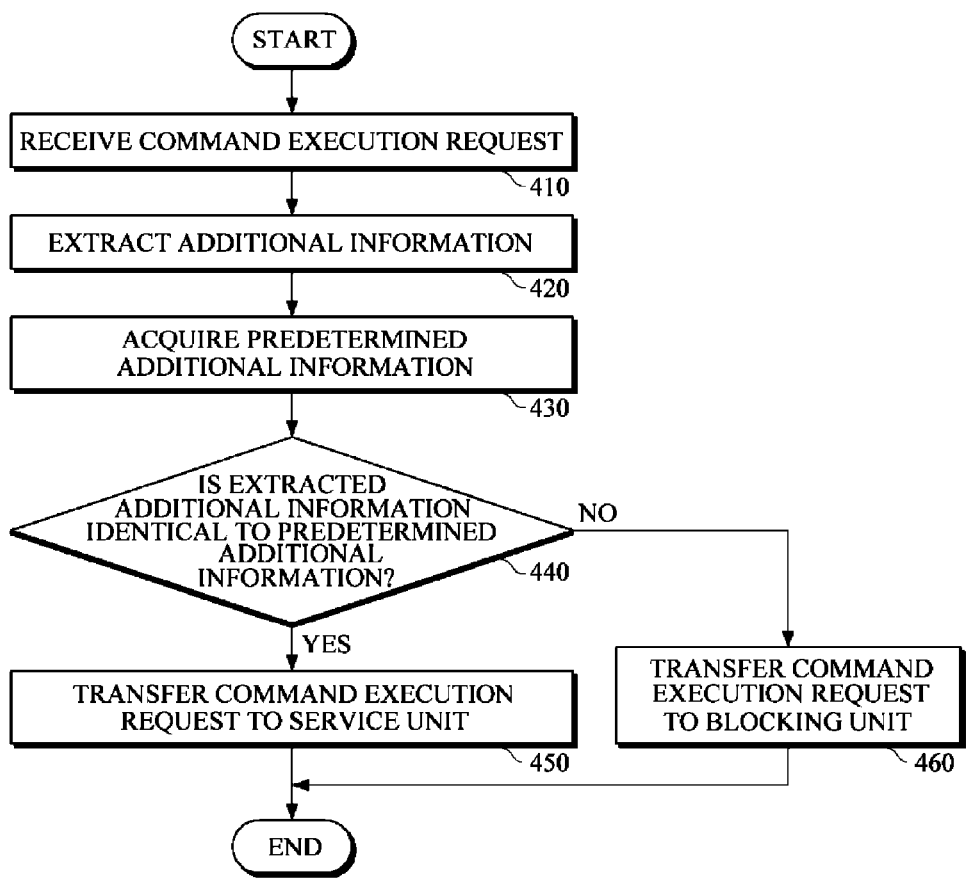
FIG. 4 is a flowchart illustrating an operation of a determining module B according to an exemplary embodiment of the invention.

FIG. 4 is a flowchart illustrating an operation of the determining module B according to an exemplary embodiment of the invention.

Referring to FIG. 1, FIG. 2A, and FIG. 4, if the determining module B receives a command execution request (410), the determining module B extracts additional information from the command execution request (420).

The determining module B acquires predetermined or reference additional information from the determination information storage 230 (430). The determining module B determines whether the extracted additional information is identical or similar to the predetermined or reference additional information (440).

If the extracted additional information is identical to the predetermined or reference additional information, the determining module B transfers the command execution request to the service unit 220 so that the service unit 220 executes the corresponding service or application in response to the command execution request (450). If the extracted additional information is not identical or similar to the predetermined or reference additional information, the determining module B determines that the command execution request is a command execution request that may not have been intended or authorized by a user, and transfers the command execution request to the blocking unit 260 so that the blocking unit 260 blocks the command execution request (460).

Here, the additional information may be a value that corresponds between the application part 100, the framework part 200, and the determining module B. The additional information may include, without limitation, a combination of unique information of a terminal, a key value, an arbitrary value (e.g., a true/false flag, a parameter name, a parameter value of a command, and the like), or a combination thereof.

Generally, a call command may be expressed as follows.

Intent intent=new Intent(Intent.ACTION_CALL, Uri.fromParts("tel", phoneNumber, null));

An application that tries to make a call generally requests to execute a call command as expressed above. Here, "Intent.ACTION_CALL" command may correspond to the call command, and "Uri.fromParts("tel", phoneNumber,null))" command may correspond to information regarding a phone number. The additional information may be processed according to the following command.

Intent intent=new Intent(Intent.ACTION_CALL, Uri.fromParts("tel", phoneNumber, null));
intent.setFlags(0x50505050);

Through a function setFlags( ), a reference flag value may be set between the application and the determining module B to request execution of the call command.

Intent intent=new Intent(Intent.ACTION_CALL, Uri.fromParts("tel", phoneNumber, null));
intent.putExtra("ParameterName", ParameterValue);

Through a function putExtra( ), a reference parameter name and a reference parameter value may be transferred to the determining module B if the call command is executed. After execution of the call command is requested as described above, the determining module B may determine whether a flag, a parameter name, and a parameter value of the call command are identical or similar to the reference values, respectively. Accordingly, the determining module B may determine whether the call command has to be executed.

Additional information may be transferred by transmitting/receiving parameters or files.

A method for transferring additional information by transmitting/receiving parameters has been described above, and a method for transmitting additional information by transmitting/receiving files is as follows.

Intent intent=new Intent(Intent.ACTION_CALL, Uri.fromParts("tel", phoneNumber, null));

If a command Intent.ACTION_CALL is called, a corresponding value is recorded in a corresponding file, and then execution of the command Intent.ACTION_CALL may be requested.

For example, if parameter value 0x50505050 is a corresponding parameter value to a VoiceCallExtra command, which may be transferred to a CommandExtraInfo.text file, an application may record the parameter value of 0x50505050 in the respective file in response to the corresponding command being called. Further, the determining module B may determine whether the extracted parameter value of 0x50505050 corresponds to the parameter value of the VoiceCallExtra command of the promised file CommandExtraInfo.text before the called command is executed, and determine whether the command has to be executed. Thereafter, the determining module B may initialize the parameter value of the VoiceCallExtra command for later use.

As such, in the case where execution of a command is determined based on additional information, a command from an application that does not include corresponding additional information may not be executed. Accordingly, security based on additional information may be provided. In this case, since the additional information may be information corresponding between an internal application installed by a manufacturing company and a determining module, the additional information may be used to increase reliability of applications installed by the manufacturing company and to provide a service blocking operation against unauthorized applications or unauthorized operation of the applications.

Figure 5:
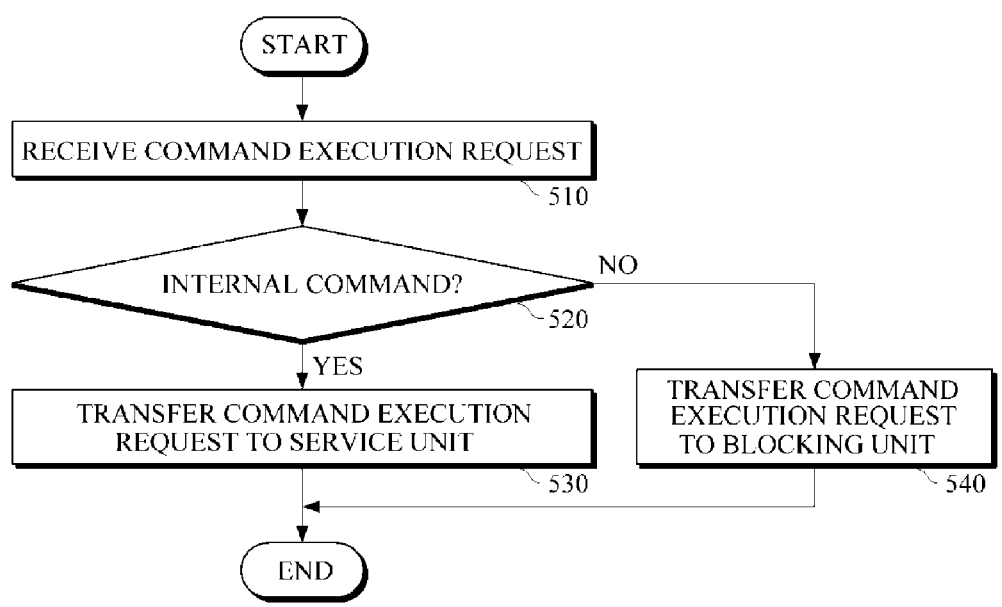
FIG. 5 is a flowchart illustrating an operation of a determining module C according to an exemplary embodiment of the invention.

FIG. 5 is a flowchart illustrating an operation of a determining module C according to an exemplary embodiment of the invention.

Referring to FIG. 1, FIG. 2A, and FIG. 5, if the determining module C receives a command execution request (510), the determining module C determines whether the corresponding command is an internal command to which an access is allowed in one or more installed applications (520). If the corresponding command is an internal command, the determining module C transfers the command execution request to the service unit 220 so that the service unit 220 executes the command (530).

If the corresponding command is an external command, the determining module C transfers the command execution request to the blocking unit 260 so that the blocking unit 260 blocks the command execution request (540). That is, the determining module C determines that the command is a command received from an outside source and blocks the command.

The process described above will be described in more detail, below.

A call command on an Android platform may be Intent.ACTION_CALL. If the call command Intent.ACTION_CALL is an open command, the call command Intent.ACTION_CALL can be used in various applications. Accordingly, an internal command Intent.ACTION_CALL_INTERNAL may be promised or arranged between applications provided by a system, a framework, and the determining module C, and the internal command Intent.ACTION_CALL_INTERNAL may not be accessible from the outside. If an arbitrary application requests execution of a command using Intent.ACTION_CALL, instead of Intent.ACTION_CALL_INTERNAL, the command execution request may be blocked.

If an application makes an access request using an Intent.ACTION_CALL_INTERNAL command, access may be granted since the Intent.ACTION_CALL_INTERNAL command may be a promised or arranged command.

Since the internal command may refer to information promised or arranged is between applications installed by a manufacturing company, a framework, and determining modules, the internal command may be used to ensure reliability of applications installed by the manufacturing company and to provide a service blocking operation against third party or unauthorized applications.

Figure 6:
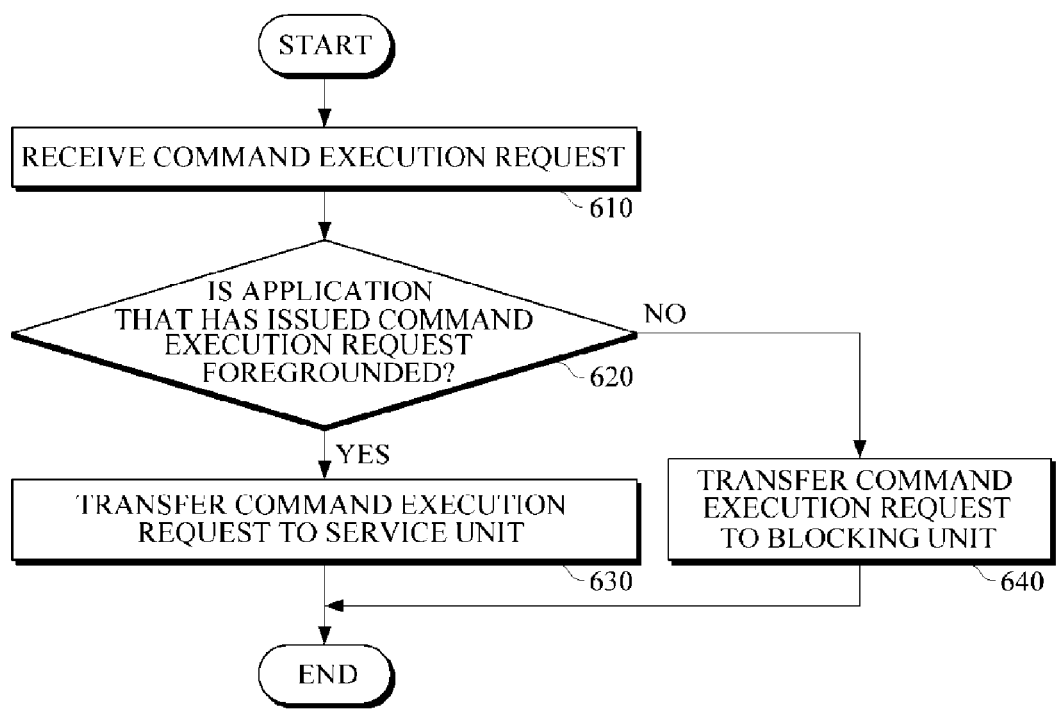
FIG. 6 is a flowchart illustrating an operation of a determining module D according to an exemplary embodiment of the invention.

FIG. 6 is a flowchart illustrating an operation of the determining module D according to an exemplary embodiment of the invention.

Referring to FIG. 1, FIG. 2A, and FIG. 6, if the determining module D receives a command execution request, the determining module D requests an activity manager to send an ActivityManager.RunningServiceInfo command (610). The determining module D determines whether an application called through the command execution request is displayed on the foreground or foregrounded on a screen (620). If execution of a command calling an application is requested and the application called through the command request is not foregrounded on a screen, it may be determined that the corresponding command has not been requested by a user.

If the application is foregrounded on the screen, the determining module D determines that the execution of the corresponding command calling that application is allowed, and transfers the command execution request to the service unit 220 so that the service unit 220 executes the command (630).

If the application is not foregrounded on the screen, the determining module D determines that the command is a command that tries to make an abnormal access, and transfers the command execution request to the blocking unit 260. Since a command execution request from an application that is not foregrounded on the screen has a possibility that the command execution request has not been intended by a user, security against such a request may be provided through the process described above.

Figure 7:
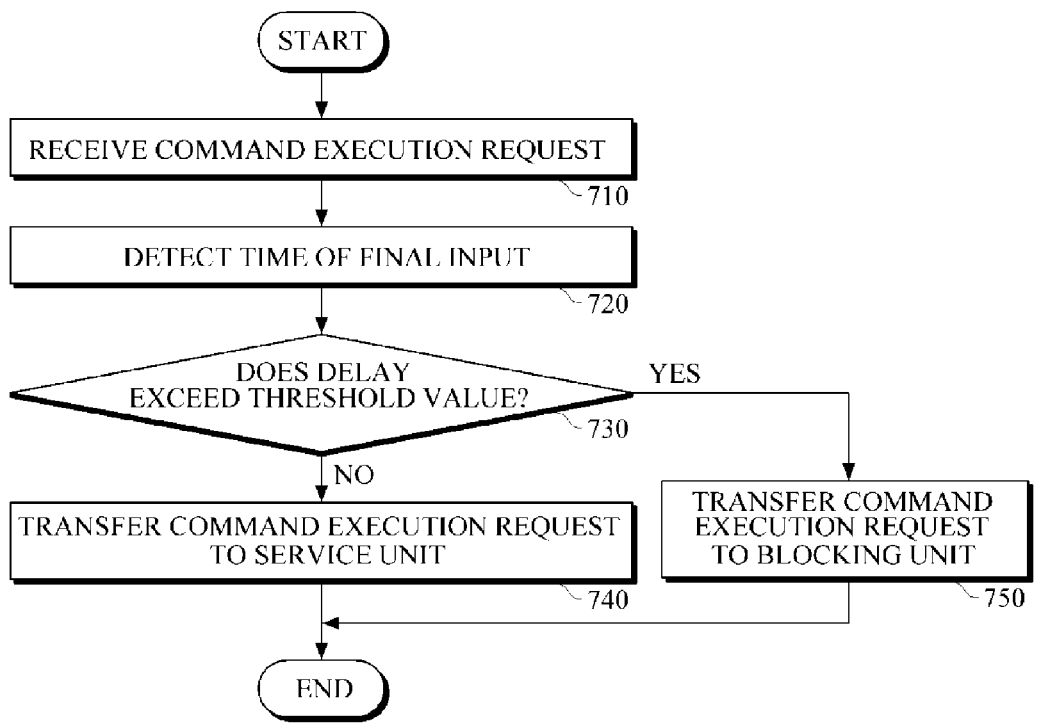
FIG. 7 is a flowchart illustrating an operation of a determining module E according to an exemplary embodiment of the invention.

FIG. 7 is a flowchart illustrating an operation of the determining module E according to an exemplary embodiment of the invention.

A command execution request may generally be issued or initiated through an input (e.g., a touch, a pressure on a specific key, an input through an ear-jack, an input through Bluetooth®, and the like) from an input device. However, such a command execution request may be manipulated by a hacking attack or unauthorized actions by a malicious program. Accordingly, a method for determining and executing commands generated from an authorized input device. In the case of the Android® platform, information inputted through an input device is transferred to InputDispatcher.cpp, and the InputDispatcher.cpp transfers the information to a system framework. If the input information is transferred from InputDispatcher.cpp to the system framework, information about the input device may be transferred to the determining module E. The information about the input device may be transferred to the determining module E using a file or queue. A command execution request may be received in a reference time period after an input is generated from an input device. The determining module E may determine a command execution request received through a virtual input and not through a real input device, as an abnormal command execution request, and block the command execution request. A time of a final input received through an input device may be stored in the corresponding module.

Referring to FIG. 1, FIG. 2A, and FIG. 7, the determining module E (see FIG. 2A) detects, if the determining module E receives a command execution request (710), a time of a final input or an input through an input device (720). Then, the determining module E determines whether a difference between the final input time and a time at which the corresponding command is actually inputted exceeds a reference threshold value (730).

If the difference is smaller than or equal to the reference threshold value, the determining module E transfers the command execution request to the service unit 220 (see FIG. 1).

If the difference exceeds the reference threshold value, the determining module E transfers the command execution request to the blocking unit 260 to limit the command execution request.

In this way, the determining module E may distinguish inputs received through physical input devices from virtually manipulated input information.

The setting group will be described below.

Figure 8A:
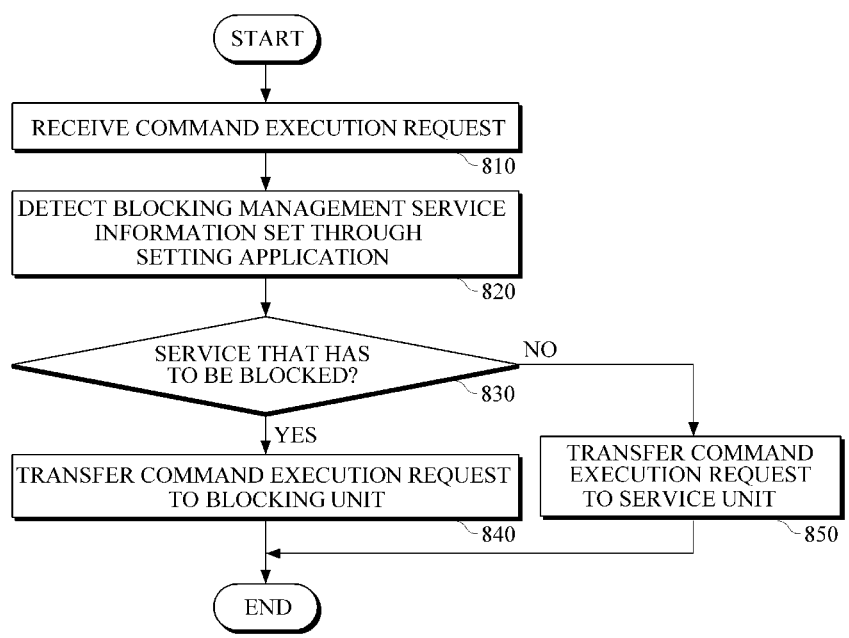

FIG. 8A and FIG. 8B are figures illustrating an operation of a determining module F according to an exemplary embodiment of the invention.

Referring to FIG. 1, FIG. 2A and FIG. 8A, if the determining module F receives a command execution request (810), the determining module F detects blocking management information that has been set through a setting application (820). The determining module F determines whether a service corresponding to the command execution request is a service determined to be blocked based on the blocking management information (830). In an example, blocking management information may refer to a list of various commands, applications, services, and/or APIs that are set to be authorized or unauthorized. For example, referring to FIG. 8B, services related to voice call, multimedia, GPS, Email, and WIFI are authorized to be executed, whereas SMS and 3G DATA services are not.

If the corresponding service is a service that is determined to be blocked, the determining module F transfers the command execution request to the blocking unit 260 (840).

If the corresponding service is not a service determined to be blocked, the is determining module F transfers the command execution request to the service unit 220 (850).

For example, if a voice call operation is set to an operation to be blocked by the setting application, the determining module A, the determining module B, the determining module C, the determining module D, and the determining module E of the determining unit operate as follows.

The determining module A may disable API and the remaining commands with the exception of an ACTION_CALL command in the execution command management table, and manages the ACTION_CALL command. In this case, normal operations of the mobile communication terminal (e.g., SMS, GPS, 3G data, and the like) may operate regardless of the blocking operation. The determining module B may process no additional information with respect to the API and the remaining commands except for the ACTION_CALL command as described above. The determining module C may process internal and external commands without distinguishing them, with respect to the API and the remaining commands except for the ACTION_CALL. The determining module C may block the ACTION_CALL command and normally processes ACTION_CALL_INTERNAL command.

In the case of the determining module D, the remaining commands except for the ACTION_CALL command and an API execution request operate regardless of whether a requested application is currently foregrounded on a screen. The determining module D processes the ACTION_CALL command so that no external command operates and the ACTION_CALL_INTERNAL command, which is an internal command, operates normally. The determining module E may operate regardless of a setting application of the determining module F.

Figure 9A:
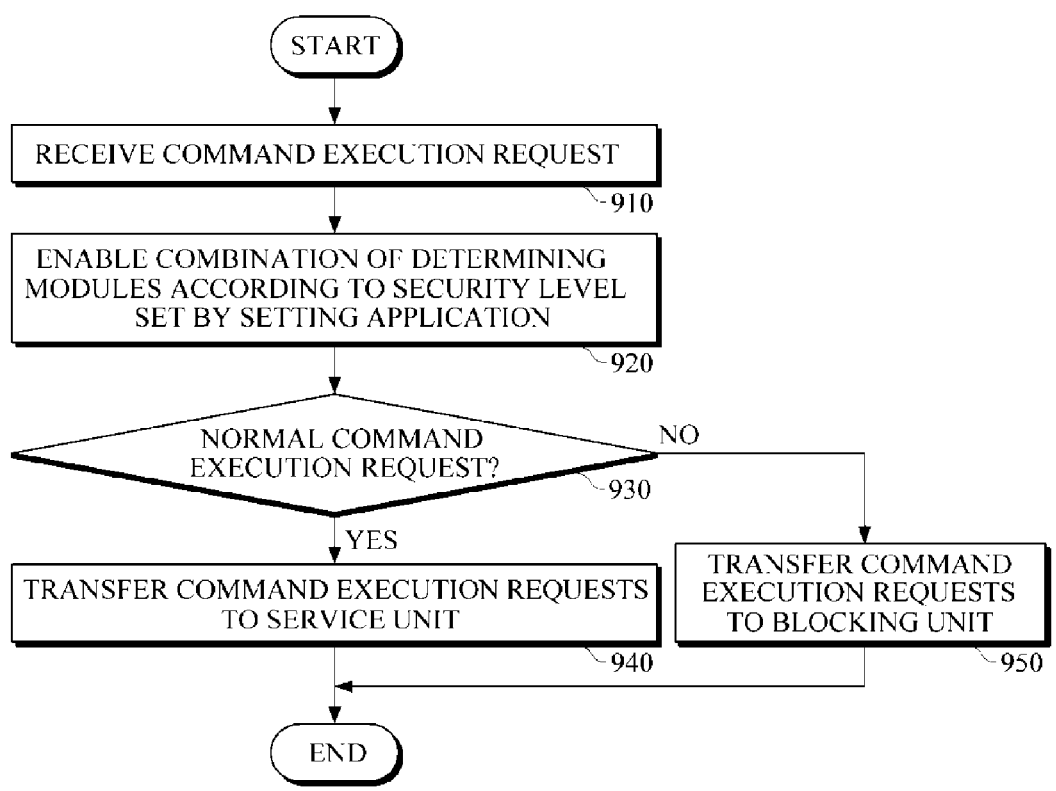

FIG. 9A and FIG. 9B are figures illustrating an operation of a determining module G according to an exemplary embodiment of the invention.

Referring to FIG. 1, FIG. 2A, and FIG. 9A, if the determining module G receives a command execution request from an application (910), the determining module G acquires security level information from the determining information storage 230, and enables a reference combination of the determining module A, determining module B, determining module C, determining module D, and determining module E according to the security level information (920).

The security level information may be as follows.

A security level may be set to "high", "middle", "low", and "default".

If the security level is determined to be at a "high" level, all of the determining modules may operate.

If the security level is determined to be at a "middle" level, the determining module A, determining module B, determining module C, and determining module D may operate.

If the security level is determined to be at a "low" level, the determining module E operates.

If the security level is determined to be at a "default" level, the determining module G may process command execution requests without blocking them.

Then, the enabled determining modules may determine whether the command execution request is a normal command execution request (930). If the command execution request is determined to be a normal command execution request, the determining modules transfer the command execution request to the service unit 220. If the command execution is determined not to be a normal command execution request, the determining modules transfer the is command execution request to the blocking unit 260.

Figure 10A:
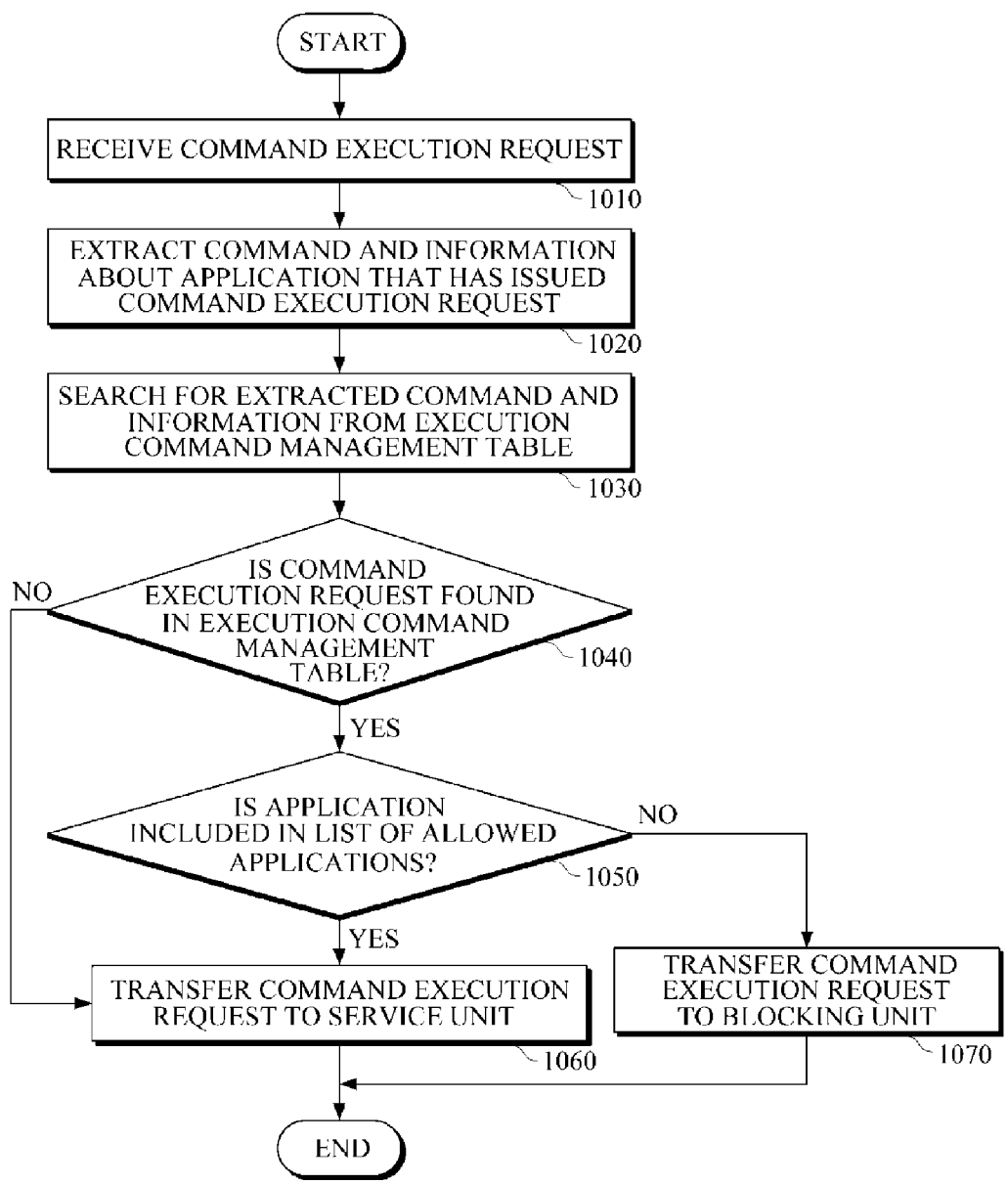
FIG. 10A and FIG. 10B are figures illustrating an operation of a determining module H according to an exemplary embodiment of the invention.
Figure 10B:

FIG. 10A and FIG. 10B are figures illustrating an operation of a determining module H according to an exemplary embodiment of the invention.

Referring to FIG. 1, FIG. 2A, and FIG. 10A, if the determining module H receives a command execution request (1010), the determining module H extracts the corresponding command and information about an application that has issued the command execution request (1020). The determining module H searches for the extracted command and information from the execution command management table (1030), and determines whether the command is not listed in the execution command management table (1040) or whether the application is included in a list of allowed applications (1050). If the command is not listed in the execution command management table or if the application exists in a list of allowed applications, the determining module H transfers the command and information to the service unit 220 (1060).

If the application is not included in the list of allowed applications, the determining module H transfers the extracted command and information to the blocking unit 260 (1070). If an execution request for a command listed in the execution command management table is received from a disallowed application, the determining module H may limit an access to the command, thereby enhancing security.

For example, if an execution command ACTION_CALL is inputted to the determining module A, the determining module A may extract the execution command ACTION_CALL, and acquire information indicating a package name of an application that may have issued the execution command ACTION_CALL from an activity manager.

The determining module A may search for the information indicating the package name of the application from the execution command management table, through combinations is of package names. If the acquired package name is identical to or matches the package name of the application is included in the execution command management table, the determining module A may execute the command. If the command is listed in the execution command management table but no package name listed in the execution command management table matches the package name of the application, the determining module A may transfer the execution command to the blocking unit 260.

If a request to process an API SmsManager.sendTextMessage( ), which may be a message sending operation, is inputted to the determining module A, the determining module A may extract the API SmsManager.sendTextMessage, and acquire information indicating a package name of an application that may have issued the request. The following process may be the same or similar as the process of processing ACTION_CALL command, as described above.

The setting application may provide a UI to register a list of allowed applications for one or more reference services. If a user attempts to select a service, a list of allowed applications may be provided to the user so that the user can select his or her desired application from among the list of the allowed applications.

Information selected by the setting application may be stored in and managed by the execution command management table of the determining module H.

Figure 11A:
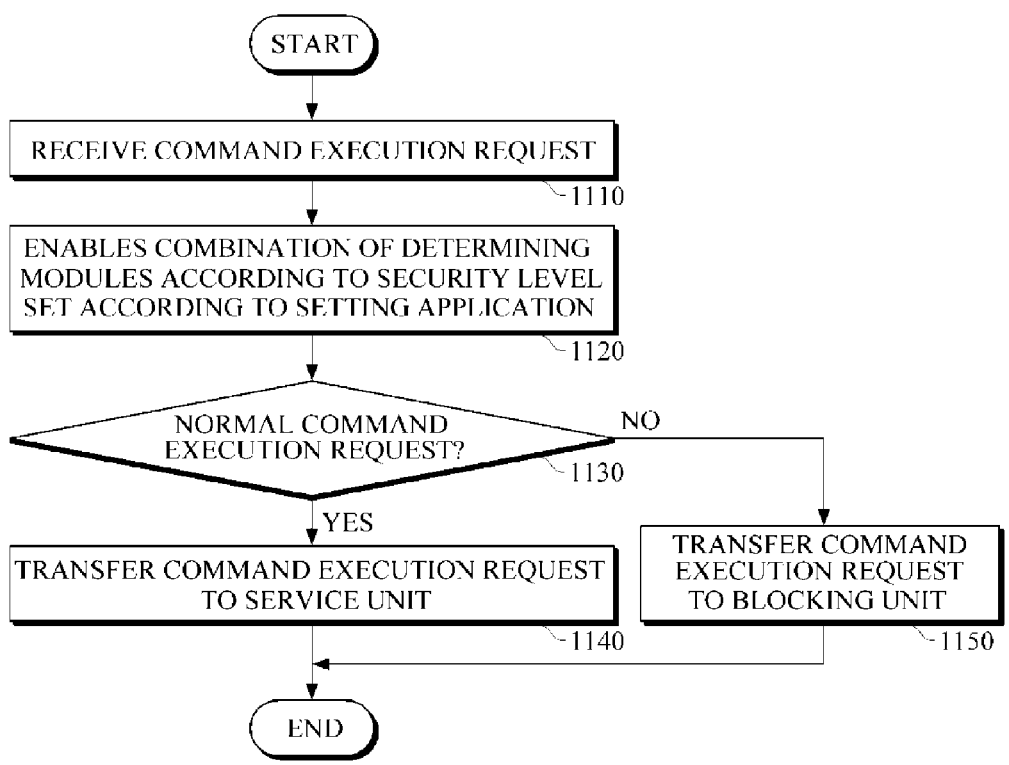

FIG. 11A and FIG. 11B are figures illustrating an operation of a determining module I according to an exemplary embodiment of the invention.

Referring to FIG. 1, FIG. 2A, and FIG. 11A, if the determining module I receives a command execution request (1110), the determining module I acquires security setting information from the determining information storage 230 and enables an appropriate determining module according to security setting information (1120).

The enabled determining module I determines whether to process the command execution request based on whether the command execution request is determined to be a normal command execution request (1130). If the command execution request is determined to be a normal command execution request, the determining module I transfers the command execution request to the service unit 220 (1140). If the command execution request is determined not to be a normal command execution request, the determining module I transfers the command execution request to the blocking unit 260 (1150).

Operation according to a security setting set by the setting application is described as follows.

In the case of a trusted application, the determining module H may be enabled.

In the case of an application installed by a manufacturing company, the determining module B or the determining module C may be enabled.

In the case of a currently activated application, the determining module D may be enabled.

In the case of a service requested by an input device, the determining module E may be enabled.

Hereinafter, the configuration and operation of the blocking unit 260 (see FIG. 1) will be described in detail.

FIG. 2B is a diagram illustrating a blocking unit according to an exemplary embodiment of the invention.

Referring to FIG. 2B, a blocking unit 260 includes a plurality of blocking modules, including a blocking module A, a blocking module B, a blocking module C, a blocking module D, a blocking module E, a blocking module F, a blocking module G, and a blocking is module H, which may be classified into two groups: an execution group 261 and a setting group 262. The execution group 261 may make determinations whether the command issued by an application is an authorized command based on information received from a manufacturing company. The setting group 262 may control driving of one or more determining modules included in the execution group 261 based on setting information of the setting application.

The operation of the blocking unit 260 will be described below.

Figure 12:
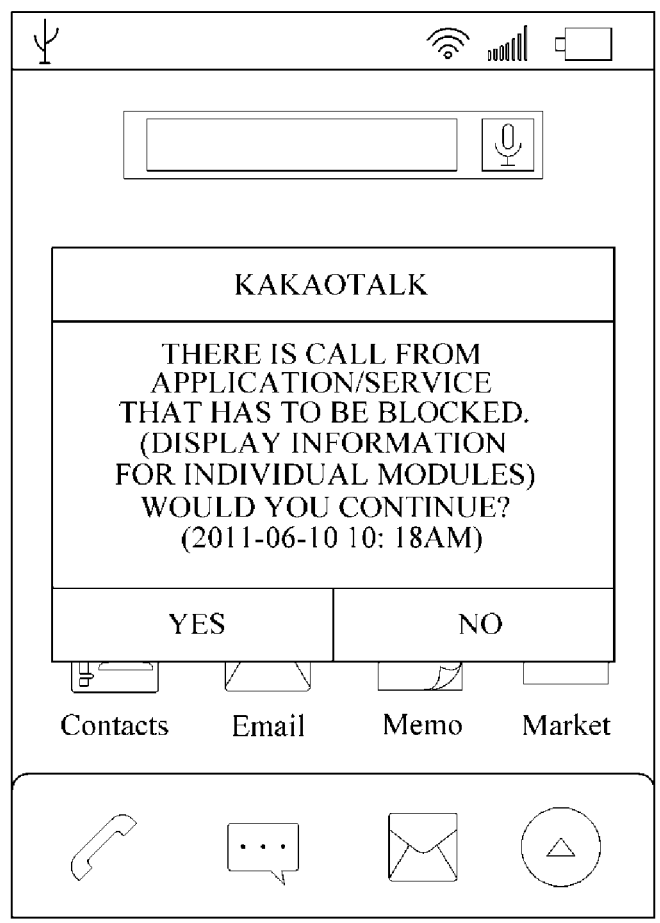
FIG. 12 is a screen shot illustrating an operation of a blocking module A according to an exemplary embodiment of the invention.

FIG. 12 is a screen shot illustrating an operation of a blocking module A according to an exemplary embodiment of the invention.

Referring to FIG. 1, FIG. 2B, and FIG. 12, if a command execution request is generated from the determining unit 240, the blocking module A may provide a user with a pop-up window. Information provided on the pop-up window may include, without limitation, a name of an application that has issued the command execution request, an access command, a command access time, and information about individual determining modules. For example, the s pop-up window may provide information similar to those illustrated in FIG. 12. The pop-up window containing information illustrated in FIG. 12 is described below according to field names.

The name of an application that has requested execution of a command: KakaoTalk

Access command: call

Command access time: 2011-06-10 10:18 AM

The determining module A, the determining module B, the determining module C, the determining module D, the determining module E, the determining module F, the determining module G, the determining module H, and the determining module I may respectively provide the following information.

The determining module A may provide information notifying that KakaoTalk does not exist in a list (e.g., an application list) of allowed applications of the command execution request. The determining module B may provide information notifying that additional information of the command execution request does not match reference additional information. The determining module C may provide information notifying that the requested execution command is not an internal command. The determining module D may provide information notifying that the application that has requested execution of the command does not exist on a current screen. The determining module E may provide information notifying that the requested execution command is requested without any external input. The determining module F may provide information notifying that a user has registered the corresponding command to block and manage it. The determining module G may provide information notifying that the requested execution command has been blocked according to a security level registered by a user. The determining module H may provide information notifying that the KakaoTalk application has not been registered as a trusted application in the requested execution command. The determining module I may provide information notifying that the requested command or the KakaoTalk application does not satisfy application or service conditions according to a security level.

After the pop-up window as described above is provided, the requested command may be executed when the user selects "Yes" button or icon to proceed.

Figure 13:
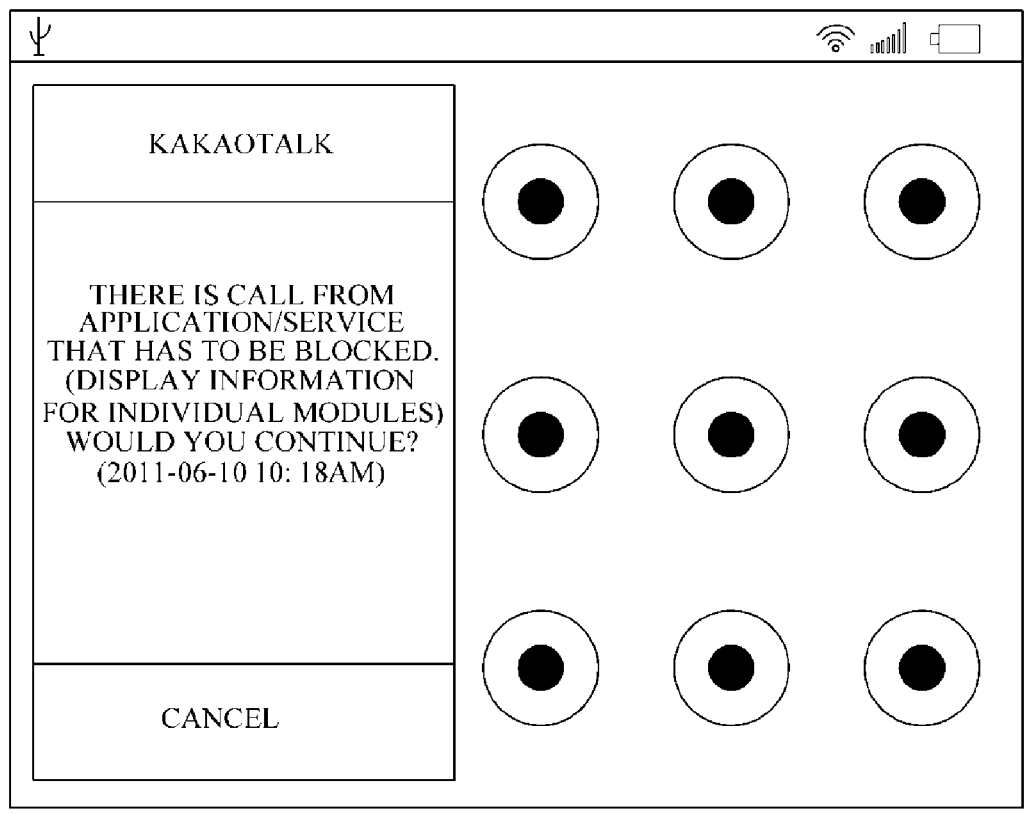
FIG. 13 is a screen shot illustrating an operation of a blocking module B according to an exemplary embodiment of the invention.

FIG. 13 is a screen shot illustrating an operation of a blocking module B according to an exemplary embodiment of the invention.

Referring to FIG. 13, if an access request is generated from an application or a service that is determined to have to be blocked by the determining unit 240, the blocking module B may display a pattern lock screen to a user. The blocking module B may allow access if the pattern lock is released. If a "Cancel" icon or button is selected on the pattern lock screen, the access request may be ignored.

Information provided on the pattern lock screen may be the same or similar as that provided through the pop-up window by the blocking module A.

Figure 14:
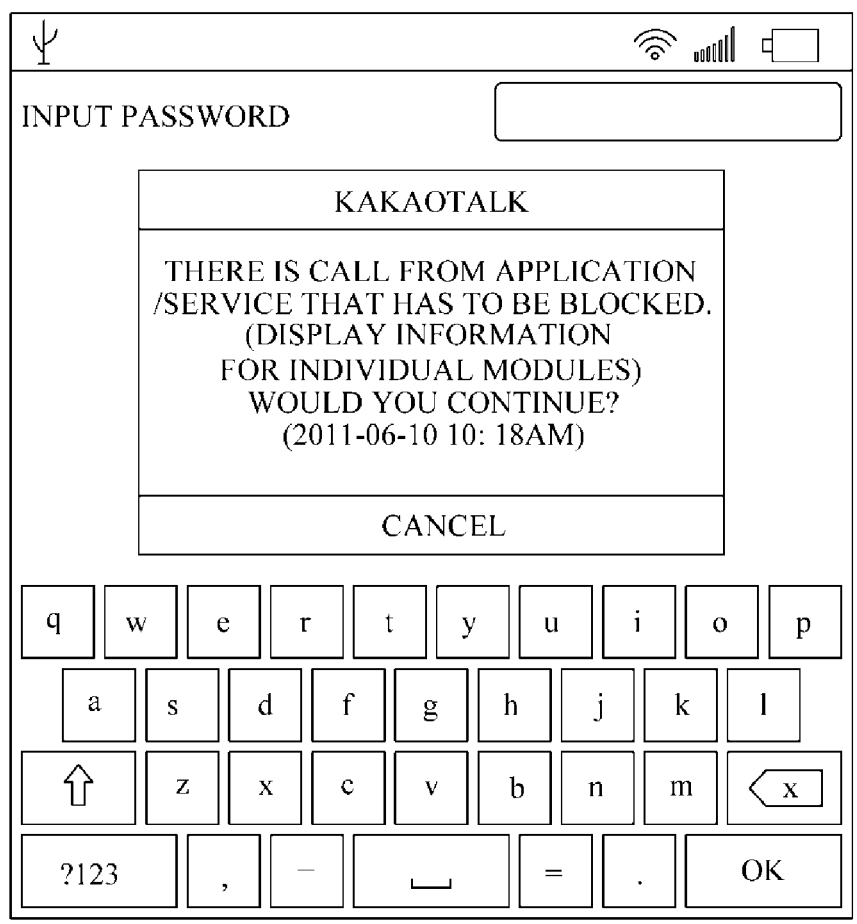
FIG. 14 is a screen shot illustrating an operation of a blocking module C according to an exemplary embodiment of the invention.

FIG. 14 is a screen shot illustrating an operation of a blocking module C according to an exemplary embodiment of the invention.

Referring to FIG. 14, if an access request is generated from an application or a service that may be determined to have to be blocked by the determining unit 240, the blocking module C may display a password input screen to a user.

The blocking module C may allow access to system resources if a correct password is input.

Information provided on the password input screen may be the same or similar as that provided through the pop-up window by the blocking module A.

Figure 15:
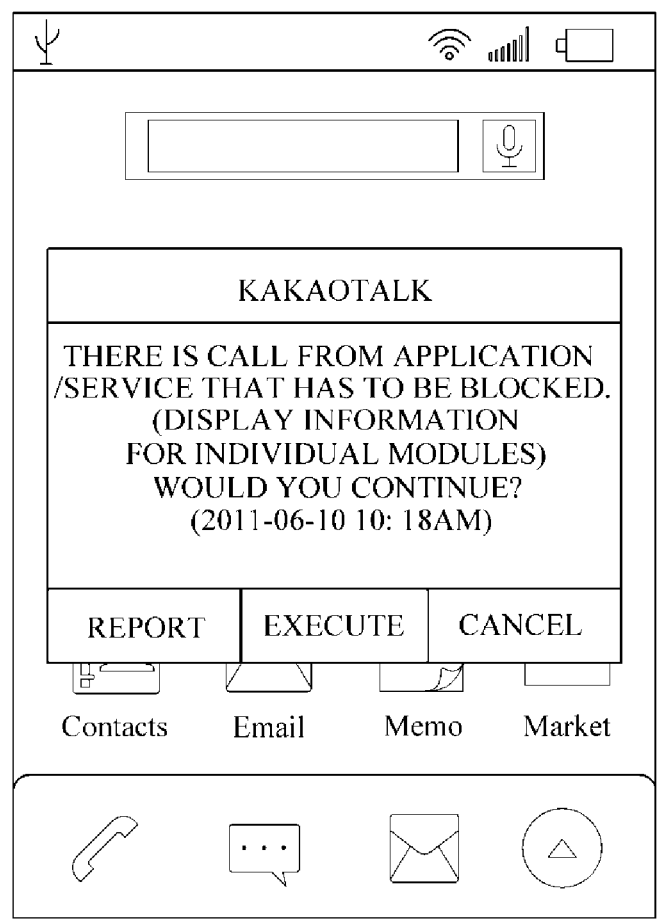
FIG. 15 is a screen shot illustrating an operation of a blocking module D according to an exemplary embodiment of the invention.

FIG. 15 is a screen shot illustrating an operation of a blocking module D according to an exemplary embodiment of the invention.

If an access request is generated from an application or a service that is determined to have to be blocked by the determining unit 240, a pop-up window may be provided. Further, if a "Report" icon or button is selected on the pop-up window, the blocking module D may report information about the application or service to a service provider (e.g., online market, alarm clock, and like) or a manufacturing company. If an "Execute" icon or button is selected, the access request may be normally processed. If a "Cancel" icon or button is selected, the access request may be ignored. Information provided on the pop-up window may be the same or similar as that provided through the pop-up window by the blocking module A.

Figure 16:
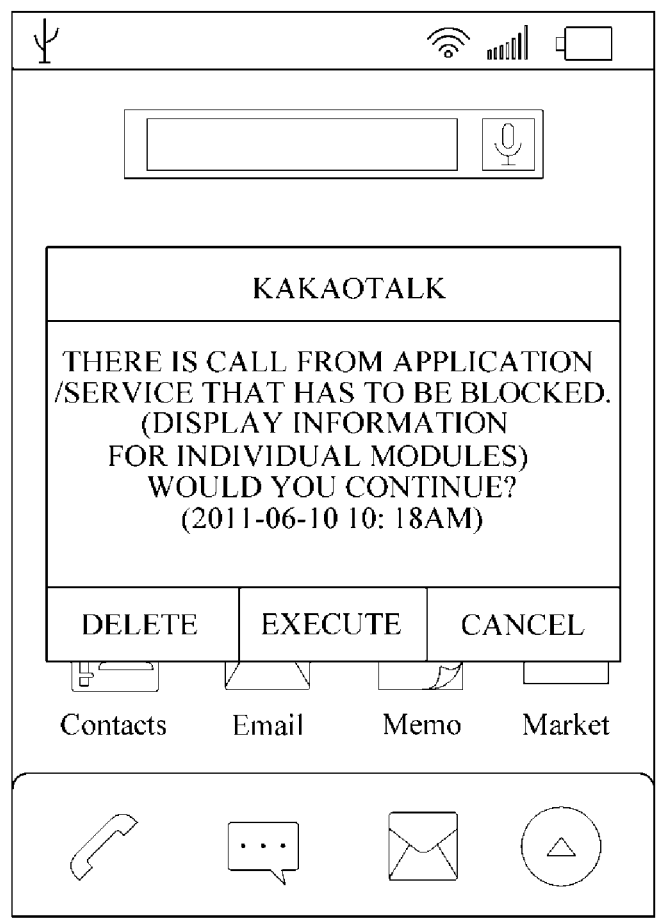
FIG. 16 is a screen shot illustrating an operation of a blocking module E according to an exemplary embodiment of the invention.

FIG. 16 is a screen shot illustrating an operation of a blocking module E according to an exemplary embodiment of the invention.

Referring to FIG. 16, if an access request is generated from an application or a service that is determined to have to be blocked by the determining unit 240, a pop-up window may be provided. If a "Delete" icon or button is selected on the pop-up window, the blocking module E may delete the application that has issued the access request. If an "Execute" icon or button is selected, the access request may be normally processed. If a "Cancel" icon or button is selected, the access request may be ignored. Information provided through the pop-up window may be the same or similar as that provided through the pop-up window by the blocking module A.

Figure 17A:
FIG. 17A and FIG. 17B are screen shots illustrating an operation of a blocking module F according to an exemplary embodiment of the invention.
Figure 17B:
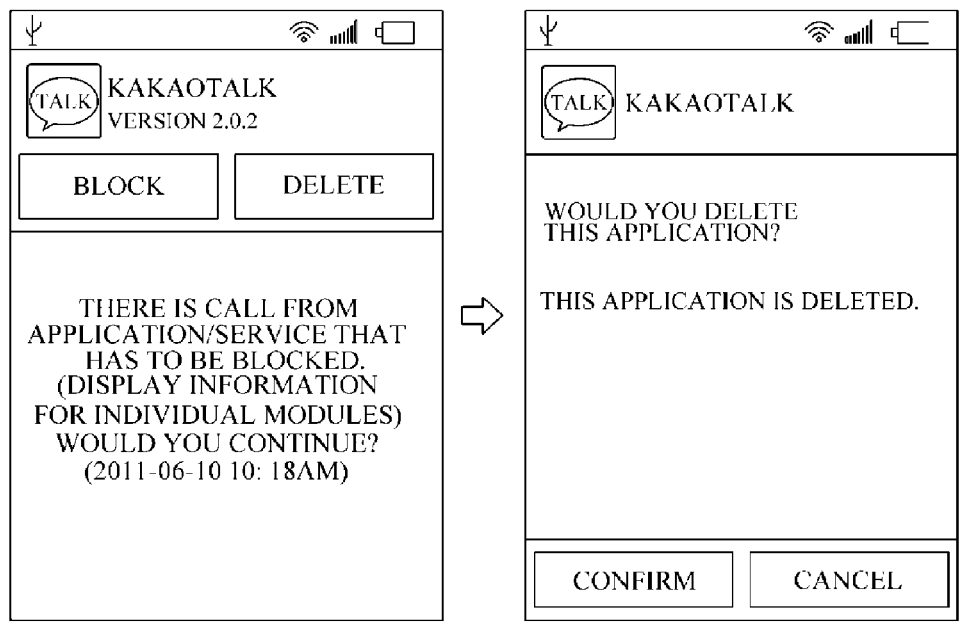

FIG. 17A and FIG. 17B are screen shots illustrating an operation of a blocking module F according to an exemplary embodiment of the invention.

The blocking module F may transfer, if an access request is generated from a blocked application or service, information provided from the determining module to a security management application. The security management application may output, as illustrated in FIG. 17A, information about the application or service blocked by the blocking module F in the form of a list. Here, the information may be similar to that provided by the blocking module A. Also, the security management application may inform, as illustrated in FIG. 17B, a user of information about the blocked application or service, and blocks or deletes the corresponding application or service according to a request from the user.

Figure 18:
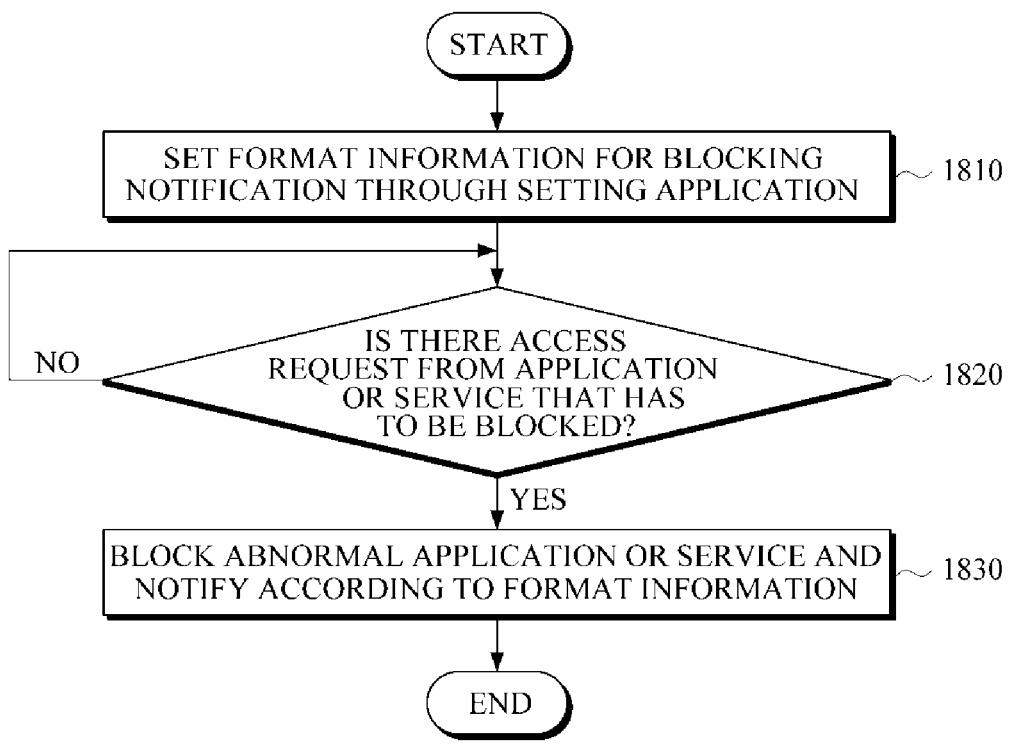
FIG. 18 is a flow chart illustrating an operation of a blocking module G according to an exemplary embodiment of the invention.

FIG. 18 is a flow chart illustrating an operation of a blocking module G according to an exemplary embodiment of the invention.

Referring to FIG. 18, format information about a blocking notification is received from a user through a setting application, and stored in a blocking unit option (1810).

Then, if an access request is generated from an application or service that is determined to have to be blocked by the determining unit (1820), the blocking module G processes the access request in the user's desired method through information about the blocking unit option (1830).

An application or service blocking method may be selected from the above-described methods or a combination of two or more combination of the above-described methods.

FIG. 19 is a screen shot illustrating an operation of a blocking module H according to an exemplary embodiment of the invention.

Referring to FIG. 19, the blocking module H may provide a user with a user interface (UI) to set a blocking notification through the setting application. The blocking notification setting may include, without limitation, a "notify to a home screen" operation, a "notify to an indicator area" operation, a "directly notify upon blocking" operation, a "store in a list" operation, and the like. In the case of the "notify to a home screen" operation, if a blocking notification is generated while a user is using another application, information about the blocking notification may be provided to the user if he or she enters the home screen, instead of directly informing the user of the blocking notification.

In the case of the "notify to an indicator area" operation, a blocking notification may be displayed on the indicator area as soon as it is generated. In the case of the "directly notify upon blocking" operation, if a blocking notification is generated, the blocking notification may be directly or indirectly informed to a user using one or more methods by the blocking is modules described above. In the case of the "store in a list" operation, information reporting that a blocking notification has been generated may be stored as a list in the security management application. In this case, the information may be checked through the security management application.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
   an application part to receive information related to an application and to receive reference information used for determining whether to block an unauthorized command, the application being an authorized application or an unauthorized application;
   a determining unit to receive a request to execute a command issued by the application and to determine, using the set reference information, whether the command or the application is authorized to access a system resource of the mobile terminal;
   a blocking unit to block an execution of the command in response to a determination that the execution of the command is unauthorized or issued by the unauthorized application; and
   a service unit to execute the command in response to a determination that the execution command is authorized and issued by the authorized application.

2. The mobile terminal of claim 1, wherein the request to execute a command comprises an execution command and a request to access an Application Platform Interface (API) or data storage.

3. The mobile terminal of claim 1, wherein the system resource of the mobile terminal comprises an Application Platform Interface (API) or data storage.

4. The mobile terminal of claim 1, wherein the determining unit extracts the command and a packet name of the application from the request, and compares the extracted values to a reference value stored in an execution command management table.

5. The mobile terminal of claim 1, further comprising a determination information storage unit to store reference information related to the application.

6. The mobile terminal of claim 5, wherein the determining unit extracts information from the request and determines whether the extracted information corresponds to the reference information.

7. The mobile terminal of claim 6, wherein the extracted information from the request comprises at least one of information related to the mobile terminal, a key value, a parameter value, and a parameter name.

8. The mobile terminal of claim 1, wherein the determining unit determines that the requested command or the application is authorized if the requested command is an internal command.

9. The mobile terminal of claim 1, wherein the determining unit determines that the application is authorized if the application, in response to being called, is executed to be displayed on a foreground of a display screen.

10. The mobile terminal of claim 1, wherein the determining unit determines that the requested command is an unauthorized command, if a difference between a key input time transmitting the request and a time of execution of the command exceeds a reference threshold value.

11. The mobile terminal of claim 1, wherein the determining unit determines whether the application is unauthorized based on blocking management information.

12. The mobile terminal of claim 1, wherein the blocking unit reports information related to the unauthorized application, comprising:
a name of the application, an access time, an access command, and information related to an attempted access.

13. A method for securing information in a mobile terminal, comprising:
receiving information related to an application;
receiving reference information for determining whether to block an unauthorized command;
receiving a request for executing a command issued by the application;
determining, using the reference information, whether the requested command or the application is authorized to access a system resource of a mobile terminal;
blocking execution of the command in response to a determination that the execution of the command is unauthorized or issued by an unauthorized application; and
executing the command in response to a determination that the execution of the command is authorized or issued by an authorized application.

14. The method of claim 13, wherein determining whether the requested command or the application is authorized further comprises:
extracting a command and information related to the application from the request; and
comparing the extracted command and information to a stored reference value for determining whether the requested command or the application is authorized.

15. The method of claim 13, wherein determining whether the requested command or the application is authorized further comprises:
extracting additional information related to the request; and
comparing the extracted additional information to an acquired reference value for determining whether the requested command or the application is authorized.

16. The method of claim 13, wherein determining whether the requested command or the application is authorized further comprises:
determining whether the command is an internal command; and
blocking the execution of the command in response to the command being determined not to be an internal command, wherein the internal command is issued from an internal source of the mobile terminal.

17. The method of claim 13, wherein determining whether the requested command or the application is authorized further comprises:
determining the command or the application, when executed, is to be displayed on a foreground of a display screen of the mobile terminal; and
blocking the execution of the command or the application if the command is determined not to be displayed on the foreground of the display screen of the mobile terminal.

18. The method of claim 13, wherein determining whether the requested command or the application is authorized further comprises:
calculating a delay between a time of input detection and a time that the command is executed;
comparing the delay with a reference threshold value; and
determining that the command or the application is unauthorized in response to the delay exceeding the reference threshold value.

19. The method of claim 13, wherein determining whether the requested command or the application is authorized further comprises:
detecting blocking management service information; and
determining whether a service corresponding to the request is authorized based on the blocking management service information.

20. The method of claim 13, wherein determining whether the requested command or the application is authorized is based on a security level of the application.

21. The method of claim 13, wherein determining whether the requested command or the application is authorized further comprises:
setting format information for blocking notification;
determining whether an access request from the application is to be blocked; and
blocking the application according to format information in response to the determination that the access request from the application is to be blocked.

22. A method for securing information in a mobile terminal, comprising:
storing a reference value corresponding to a command and a list of authorized applications;
receiving reference information for determining whether to block an unauthorized command;
receiving a request for executing a command issued by an application;
extracting the command and information related to the application from the request;
comparing the extracted command and information to a stored reference value for determining whether the requested command or the application is authorized;
blocking the execution of the command in response to a determination that the execution of the command or the application is unauthorized; and
executing the command in response to a determination that the execution command and the application are authorized,
wherein the determination of whether the requested command and the application are authorized is made using the reference information.

* * * * *